Nov. 18, 1958 S. MAY 2,860,422
MULTIPLE ANSWER ELECTRICAL QUIZ GAME
Filed April 16, 1956 2 Sheets-Sheet 1
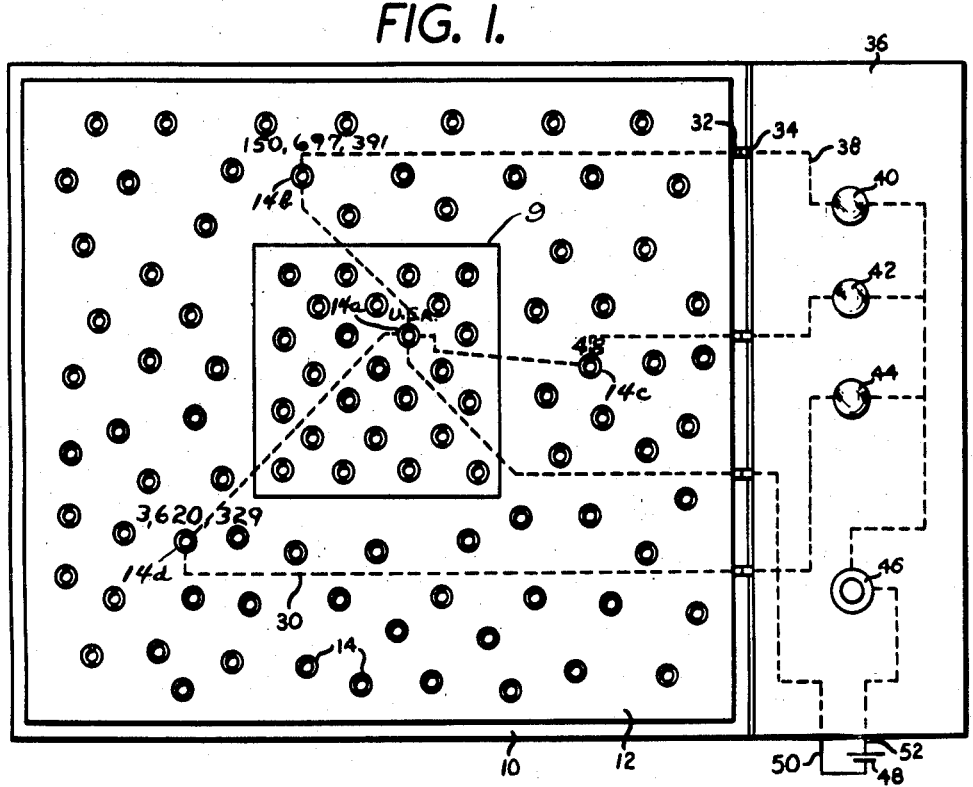
FIG. 1.
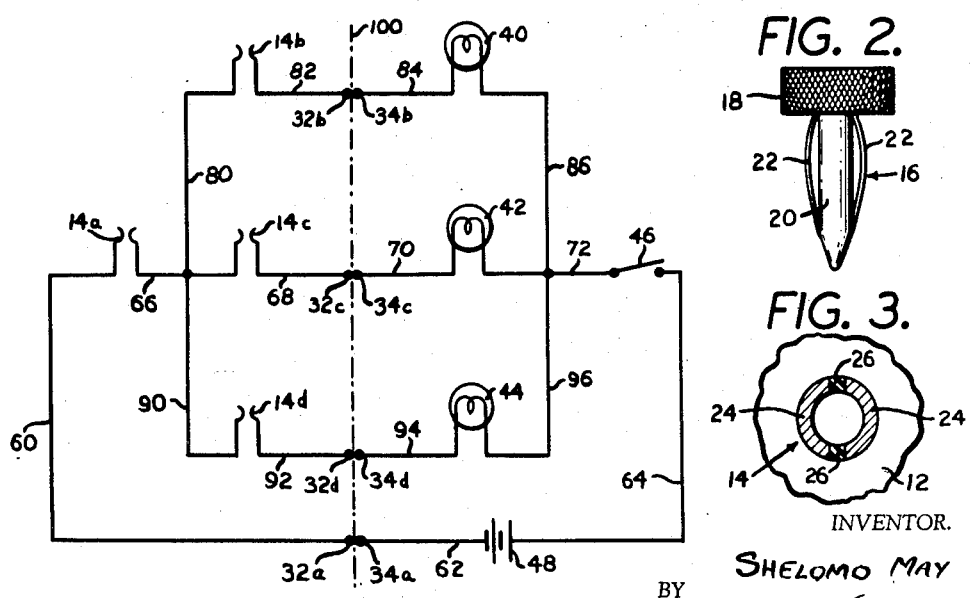
FIG. 2.
FIG. 3.
FIG. 4.
INVENTOR.
SHELOMO MAY
BY
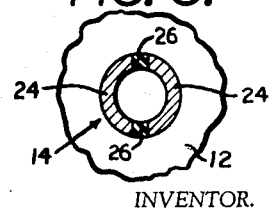

Nov. 18, 1958  S. MAY  2,860,422
MULTIPLE ANSWER ELECTRICAL QUIZ GAME
Filed April 16, 1956  2 Sheets-Sheet 2

INVENTOR.
SHELOMO MAY
BY

United States Patent Office 2,860,422
Patented Nov. 18, 1958

2,860,422

MULTIPLE ANSWER ELECTRICAL QUIZ GAME

Shelomo May, Jerusalem, Israel

Application April 16, 1956, Serial No. 578,274

3 Claims. (Cl. 35—9)

This invention relates to a multiple answer electrical quiz game.

In conventional electrical quiz games, a single signal is provided for a single correct answer. There is no relationship between any one correct answer and another. As each correct answer is given, the signal is energized and there is no connection whatsoever with the preceding correct answers or the succeeding correct answers. Furthermore, conventional electrical quiz games are provided with only two plugs which are permanently connected to a pair of conductors. These plugs can be used to give only a single correct answer each time the game is played so that it becomes necessary to withdraw them from the game board at the conclusion of each correct answer so that the next correct answer may be given. Another disadvantage in conventional electrical quiz games is that the relationship of their several electrical sockets or jacks is fixed at all times irrespective of the nature of the questions which are posed and the answers which are given. Consequently, it is easy to become familiar with the relative locations of the several related sockets or jacks and correct answers may be given without any knowledge whatsoever of their subject matter.

One important object of the present invention is the provision of a multiple answer electrical quiz game which has cumulative means for signaling a series of correct answers. For example, a game made in accordance with this invention may be provided with ten series of questions and answers, each series consisting of three questions and three answers. In playing the game, each series would be approached independently of the remaining series and an attempt would be made to answer the three questions of the given or selected series. If only one correct answer is given, a certain signal will be energized. Should a second correct answer be given, a second signal would be energized. And should the third correct answer be given, a third signal would be energized. These three signals would have different values, the second would exceed the value of the first and the third would exceed the value of the second.

In one form of the present invention, as the second signal is energized, the first would be de-energized and as the third signal is energized the second would be de-energized. In another form of this invention, each preceding signal would remain energized when the succeeding signals are energized so that the first will remain energized when the second is energized and the first two will remain energized when the third is energized.

An important feature of this invention is the fact that there are no conductors connected to the plugs. The game may be played with only two plugs but if full advantage of its features is to be had, several plugs should be used, for example, one plug for each answer and still another plug for what may be described as the master question or at least the key element of the master question.

As in conventional electrical quiz games, the game board of the present game is inter-changeable with other game boards of like nature but dealing with other subjects and other questions and answers. But each game board in the present invention is provided with its own wiring circuits and the wiring circuits of any one game board are different from those of the other game board. Consequently, it would not be an easy matter to familiarize oneself with the arrangement of sockets or jacks so as to be able to answer questions without actually knowing the answers.

The invention is illustrated in the accompanying drawing in which:

Fig. 1 is a plan view of an electrical quiz game made in accordance with one form of this invention.

Fig. 2 is an enlarged side view of a plug which may be used in connection with said game.

Fig. 3 is an enlarged sectional view of one of the sockets or jacks in said game.

Fig. 4 is a schematic view or circuit diagram of a representative circuit or series of circuits as used in said game.

Figure 5:
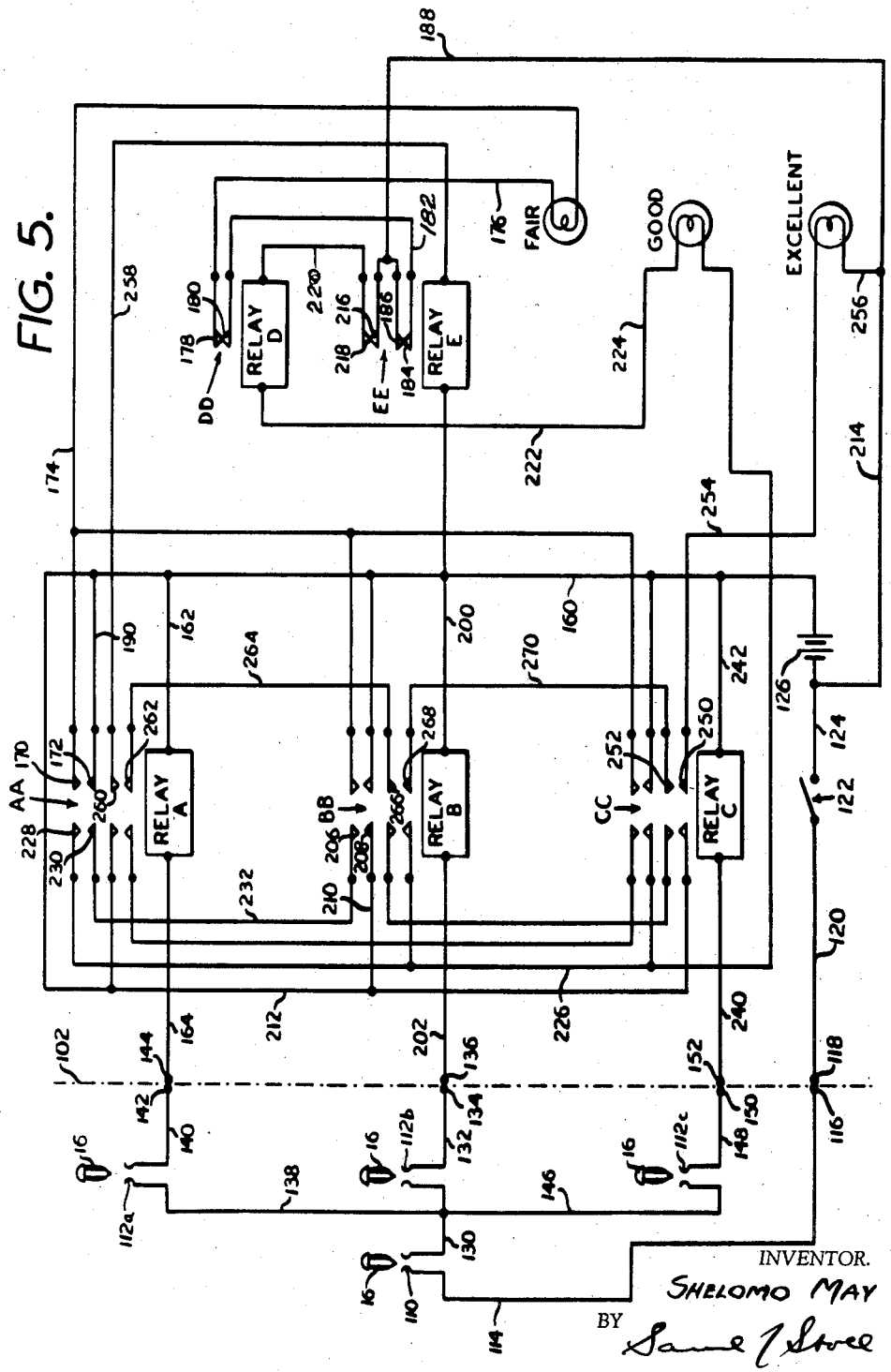
Fig. 5 is a schematic view or circuit diagram of a typical circuit or series of circuits as employed in a second form of this invention.

Referring now to the first form of this invention, it will be noted that a box or casing 10 is provided which supports all of the operative elements of the game. Included among such elements is a game board 12 which is removably and replaceably supported on the box or casing 10. The game board 12 is provided with a plurality of electrical sockets or jacks which are individually and selectively adapted to receive an electrical plug 16 as shown in Fig. 2. Although only a single plug is shown, it will be understood that as the game is set up in the drawing, it would be advantageous to use four such plugs but the game may also be played with only two. Each plug comprises a head 18 which may be grasped between the fingers, a shank or pin 20 and a pair of leaf spring elements 22. As each jack 14 is constituted, it comprises a pair of arcuate contact members 24 which are spaced from each other and separated by a pair of insulating spacers 26. The two arcuate contact members 24 are combined with the two spacers 26 to form a ring or socket adapted to receive the shank and leaf springs of the plug. Contact is made between said leaf springs and said arcuate contacts both mechanically and electrically in order to close a given circuit.

Also included among the elements in this game is a plurality of conductors 30 connected to the several jacks 14 and extending from said jacks to a series of contact members 32. These contact members are secured to the board 12 by conventional means, as are conductors 30. There is a second series of contact members 34 and they are mounted on a fixed board 36 on box or casing 10. When the game board 12 is placed upon said box 10, as shown in Fig. 1, contact members 32 will engage contact members 34 in conventional fashion. It will now be seen that conductors 38 are connected to contact members 34 and to signals 40, 42 and 44, respectively.

These signals 40, 42 and 44 are shown to be electric light bulbs but it will be appreciated that this is purely illustrative of signaling devices in general and other electrical signaling devices, both visual and aural (such as buzzers and bells) may be used for the purposes of this invention. Also connected to signaling devices 40, 42 and 44 is a push-button switch 46 which itself is connected to a source of electric current, such as a dry cell 48, by means of conductors 50 and 52.

A typical circuit or series of circuits is shown in Fig. 4. Four sockets or jacks are shown, namely, jacks 14a, 14b, 14c and 14d. A plug 16 is placed in jack 14a in order to prepare the board for a series of answers to a series of questions. The indicia on Fig. 1 illustrate the operation of this game. Jack 14a is labeled U. S. A. and all other jacks within box 9 are also labeled with the names of other countries. Various numbers are imprinted adjacent all of the jacks located outside of said box 9. Three such numbers relate to each of the countries designated within box 9, one relating to population, the other to area, and the third to the number of states or provinces or other political subdivisions of the particular country concerned. To play the game, the player selects one of the countries designated within the box, and then displays his knowledge of the population, area and political subdivisions as to that country in the following manner: Solely for the purpose of illustration, let it be assumed that jack 14a is labeled United States. Three questions relating to the United States are put to the player of the game. The first is: What is the population of the United States? The second is: How many States are there in the United States? The third is: What is the area of the United States? The several jacks on the board are all labeled with various numbers. Among these jacks is jack 14b which gives 150,697,391 as the population (1950 census) of the United States, jack 14c which gives 48 as the number of States comprising the United States, and jack 14d which gives 3,620,329 as the area in square miles of the United States. Should the player insert a second plug 16 into jack 14b, bulb 40 will light up, indicating the correctness of the answer. Should he then insert a third plug into jack 14c, bulb 42 will light up and upon insertion of a plug into jack 14d, bulb 44 will light up. The assumption is, of course, that switch 46 is closed. What is done, actually, is to depress the push button switch and thereby to close it only after the plugs are inserted so as to close the circuits to the bulb in order to test the correctness of the answers. At all other times, the switch, which is a normally open switch, remains open.

More specifically, a conductor 60 is connected to one side of jack 14a and it is also connected to contact member 32a. Said contact member 32a is an engagement with contact member 34a. A conductor 62 connects contact 34a to the dry cell 48. Another conductor 64 connects the opposite pole of said dry cell to one side of the push button switch 46. Returning now to jack 14a, it will be observed that its opposite side is connected to a conductor 66 and that said conductor is connected to jack 14c. Another conductor 68 is connected between said jack 14c and contact member 32c, the latter being in engagement with contact member 34c. A conductor 70 connects contact member 34c to bulb 42 and a conductor 72 connects said bulb to the push button switch 46. When plugs are inserted into the two jacks 14a and 14c, and the push button switch 46 is closed, a closed circuit is provided between the dry cell 48 and the bulb 42, thereby energizing and lighting up said bulb to signal a correct answer.

Plug 16 should be left in jack 14a in order to answer the other questions above mentioned, but the plug in jack 14c may be withdrawn. However, the preferred way of playing this game requires that both plugs remain in their respective jacks pending the answering of the remaining questions.

Should the player now insert a plug 16 into jack 14b, and depress push button switch 46, bulb 40 will light up. It will be observed that a conductor 80 connects one side of jack 14b to conductor 66 and that another conductor 82 connects the opposite side of said jack 14b with contact member 32b. Said contact member engages contact member 34b and a conductor 84 connects said latter contact member with bulb 40. Still another conductor 86 is connected at one end to said bulb 40 and at the other end to conductor 72. A circuit is now closed between bulb 40 and dry cell 48 and said bulb thereby is caused to light up.

When still another plug 16 is inserted into jack 14d and push button switch 46 is closed, the third bulb 44 will light up. The circuit between said bulb and the dry cell includes the following elements: A conductor 90 which is connected at one end to conductor 66 and at its opposite end to jack 14d, a second conductor 92 which is connected at one end to said jack and at its opposite end to contact member 32d, a second contact member 34d which is in engagement with said contact 32d, a conductor 94 which is connected at one end to said contact 34d and at its opposite end to bulb 44, and still another conductor 96 which is connected at one end to said bulb 44 and at its opposite end to conductor 72.

It will be understood that all elements above described which are situated on the left side of interrupted line 100 in Fig. 4 are secured to the game board 12. All of the elements which are disposed on the right side of said interrupted line are supported on fixed board 36 or by other supporting means in box or casing 10. It will also be understood that although a dry cell is shown to be the source of electrical energy in the game thus described, other conventional sources may also be used, for example, the conventional household alternating current of 110 volts in combination with a step-down transformer.

Referring now to the second form of this invention and to Fig. 5 of the drawing, it will be observed that by way of illustration the game is again set up for a series of three answers relating to a given subject and there may be as many such series and as many such subjects as a given game board will accommodate. What is shown on the right side of interrupted line 102 in Fig. 5 will remain the same irrespective of the number of series or groups of questions which are represented on the left side of said interrupted line by the jacks shown therein. On the left side of said interrupted line will be as many groups or series of jacks as the game board will accommodate and what is actually shown on the left side of said interrupted line is a representative group.

Once again there is a jack 110 which is labeled on the game board with the specific subject or subject matter of a group of three questions. Jacks 112a, 112b and 112c correspond to three questions concerning the subject represented by jack 110. A conductor 114 connects one side of jack 110 to a contact member 116 which engages a second contact member 118. A conductor 120 connects contact 118 with a push-button switch 122 and said switch is connected by a conductor 124 to a dry cell 126. The other side of jack 110 is connected by means of a conductor 130 to jack 112b and a conductor 132 connects the opposite side of jack 112b to a contact member 134. Said contact member is in engagement with a second contact member 136.

Still another conductor 138 is provided between conductor 130 and one side of jack 112a. To the opposite side of said jack is connected a conductor 140 which itself is connected to a contact member 142. Said contact member engages a second contact member 144. Still another conductor 146 is connected at one end to conductor 130 and at the opposite end to one side of jack 112c. The opposite side of said jack is connected by means of conductor 148 to a contact member 150 which is in engagement with a contact member 152. All of the elements shown on the left side of interrupted line 102 in Fig. 5, multiplied by as many groups of questions as may be desired on a given board, are all supported on a game board corresponding to game board 12 which is removable and replaceable relative to the box or casing 10. All of the elements shown on the right side of said interrupted line 102 are supported on a fixed part of the box or casing, such as board 36. The inter-connected contact members on opposite sides of said line 102 are detachable from each other in order to replace one replaceable game board with another.

Turning now to the elements on the right side of line 102 in Fig. 5, it will be observed that there are three relays A, B and C which control, respectively, gang switches AA, BB and CC which are normally open. These switches close only when their respective relays are energized. Also shown are relays D and E which control switches DD and EE respectively, these latter switches being normally closed and subject to open only when their respective relays are energized. Also shown on the right side of line 102 are three signals, in this case electric bulbs, marked, respectively, Fair, Good and Excellent. When only the first of these bulbs lights up as the result of a player's attempt to answer a series of questions, the indication is that he has been able to answer only one of such questions. Should the second bulb light up, that would indicate that two questions were correctly answered. And when the third bulb lights up, that would indicate that all three questions were correctly answered. As will shortly be seen, when the second bulb marked Good lights up, the first bulb marked Fair will be extinguished. When the third bulb marked Excellent lights up, the other two bulbs will be extinguished. Thus, at any given time, whether a single answer is correctly given, or two or three, only a single bulb will light up and the identity of that bulb will determine how many correct answers were given.

To illustrate the operation of the apparatus shown in Fig. 5, the following description will disclose a purely illustrative sequence of events: Let it be assumed that a pair of plugs 16 are inserted, respectively, into jacks 110 and 112a. The following circuit will now be closed: Conductor 114, contact 116, contact 118, conductor 120, press-button switch 122 (when depressed), conductor 124, dry cell 126, conductor 160, conductor 162, relay A, conductor 164, contact 144, contact 142, conductor 140, jack 112a (with its plug 16), conductor 138, conductor 130, and jack 110 (with its plug 16). Relay A is now energized and normally open switches AA are closed. Contacts 170 and 172 will now engage each other and the following circuit will be closed: Conductor 174, bulb Fair, conductor 176, contacts 178 and 180 of normally closed switch DD, conductor 182, contacts 184 and 186 of normally closed switch EE, conductor 188, conductor 124, dry cell 126, conductor 160, conductor 190, and finally back to contact 172. Since this closed circuit includes bulb Fair and dry cell 126, said bulb will be lit up, indicating one correct answer.

The next assumption is that a plug 16 is inserted into jack 112b while the plugs in jacks 110 and 112a remain in place. The following circuit is thereby closed: Conductor 130, jack 110 (with its plug 16), conductor 114, contact 116, contact 118, conductor 120, press-button switch 122 (when closed), conductor 124, dry cell 126, conductor 160, conductor 200, relay B, conductor 202, contact 136, contact 134, conductor 132, jack 112b (with its plug 16), and back to conductor 130. This energizes relay B and closes the normally open switch BB.

It will now be observed that the circuit to bulb Good is closed while the circuit to bulb Fair is opened (the assumption being that push-button switch 122 is closed). Since relay B is energized, contacts 206 and 208 will engage each other and close the following circuit: Conductor 210, conductor 212, conductor 160, dry cell 126, conductor 124, conductor 214, conductor 188, contacts 216 and 218, conductor 220, relay D, conductor 222, bulb Good, conductor 224, conductor 226, contacts 228 and 230, conductor 232 and back to contact 206.

It will now be observed that the circuit to bulb Good is closed so that said bulb will light up. It will also be observed that this last mentioned circuit includes and energizes relay D which thereby opens the normally closed switch DD. Once this switch opens, the circuit to bulb Fair is broken and said bulb is extinguished. Consequently, only a single bulb remains lit despite the fact that two correct answers have been given but since said bulb is marked Good, that is the indication that two correct answers have been given.

Let it now be assumed that the plugs inserted into jacks 110, 112a and 112b are permitted to remain in said jacks and that a fourth plug 16 is inserted into jack 112c. The following circuit is thereby closed upon the closing of push-button switch 122: Jack 112c with its plug 16, conductor 148, contacts 150 and 152, conductor 240, relay C, conductor 242, conductor 160, dry cell 126, conductor 124, switch 122, conductor 120, contacts 118 and 116, conductor 114, jack 110 with its plug 16, conductor 130, conductor 146 and back to jack 112c. Since relay C is in this circuit, it is energized and it closes normally open switch CC. The following circuit which includes bulb Excellent is now closed:

Contacts 250 and 252, conductor 254, bulb Excellent, conductor 256, conductor 214, conductor 124, dry cell 126, conductor 160, conductor 200, relay E, conductor 258, contacts 260 and 262, conductor 264, contacts 266 and 268, conductor 270, and back to contacts 252 and 250. Since this circuit includes bulb Excellent, said bulb will light up and since it also includes relay E, said relay will be energized and switch EE will be opened, thereby opening the circuit containing bulb Good and said bulb will be extinguished. This will indicate that three correct answers were given.

The foregoing is illustrative of preferred forms of this invention and it will be understood that these preferred forms may be modified and other forms may be provided within the broad spirit of the invention and the broad scope of the claims.

What is claimed is:

1. A multiple answer electrical quiz game, comprising a plurality of electrical signaling devices, a plurality of jacks, said jacks being grouped into a plurality of groups with a plurality of jacks in each group, there being at least three jacks in each group of jacks, a plurality of circuits connecting each group of jacks with said signaling devices, a source of electric current connected to all of said circuits, and electrically conductive plugs adapted to be inserted into said jacks, each said jack comprising a pair of electrically insulated contacts and each said plug being insertable into each said jack for engagement with said contacts to close the circuit between them, said signaling devices comprising a plurality of electric bulbs mounted on a board, said board being fixedly supported on a base, said jacks being mounted on a second board which is removably and replaceably supported on said base, the circuits between said bulbs and said jacks including a plurality of contact members on the first board and a corresponding number of contact members on the second board, the two groups of contact members being engageable with each other when the second board is mounted upon said base adjacent the first board.

2. A multiple answer electrical quiz game, comprising a plurality of electrical signaling devices, a plurality of jacks, said jacks being grouped into a plurality of groups with a plurality of jacks in each group, there being at least three jacks in each group of jacks, a plurality of circuits connecting each group of jacks with said signaling devices, a source of electric current connected to all of said circuits, and electrically conductive plugs adapted to be inserted into said jacks, each said jack comprising a pair of electrically insulated contacts and each said plug being insertable into each said jack for engagement with said contacts to close the circuit between them, each group of jacks including one principal jack and at least two secondary jacks, said secondary jacks being in circuit with said principal jack, each secondary jack being in circuit with said principal jack, each secondary jack being in circuit with one of said signaling devices, and said principal jack being also in circuit with said signaling devices, whereby the individual circuit of each said signaling device is controlled by the principal jack and the individual secondary jack which is in circuit with said signaling device.

3. A quiz game in accordance with claim 2, wherein a plurality of relay controlled normally open switches are in circuit with the jacks and a plurality of relay controlled normally closed switches are in circuit with the signaling devices and with the first mentioned relays, whereby the closing of a circuit between one principal and one secondary jack and one of the first relays will close the circuit to one of said signaling devices and whereby the closing of a second circuit between said principal jack and a different secondary jack and a different relay of the first group of relays will close the circuit to a second signaling device while energizing one of the relays in the second group of relays to open the circuit to the first mentioned signaling device and thereby to de-energize it.

References Cited in the file of this patent

UNITED STATES PATENTS

| | | |
|---|---|---|
| 2,352,182 | Brown | June 27, 1944 |
| 2,654,163 | Reynolds | Oct. 6, 1953 |
| 2,656,617 | Composto | Oct. 27, 1953 |